United States Patent
Yu et al.

(10) Patent No.: US 9,813,725 B1
(45) Date of Patent: Nov. 7, 2017

(54) SYSTEM, METHOD, AND COMPUTER PROGRAM FOR ENCODING AND DECODING A UNIQUE SIGNATURE IN A VIDEO FILE

(71) Applicant: GoAnimate, Inc., San Mateo, CA (US)

(72) Inventors: Tang Fei Yu, Tsuen Wan (HK); Omar Rabbolini, Ma Wan (HK)

(73) Assignee: GoAnimate, Inc., San Mateo, CA (US)

( * ) Notice: Subject to any disclaimer, the term of this patent is extended or adjusted under 35 U.S.C. 154(b) by 259 days.

(21) Appl. No.: 14/939,612

(22) Filed: Nov. 12, 2015

(51) Int. Cl.
| | |
|---|---|
| *G06K 9/00* | (2006.01) |
| *H04N 19/467* | (2014.01) |
| *G06T 11/60* | (2006.01) |
| *H04N 21/8352* | (2011.01) |
| *H04N 19/42* | (2014.01) |
| *G10L 19/018* | (2013.01) |

(52) U.S. Cl.
CPC ....... *H04N 19/467* (2014.11); *G06K 9/00744* (2013.01); *G06T 11/60* (2013.01); *H04N 19/42* (2014.11); *H04N 21/8352* (2013.01); *G10L 19/018* (2013.01)

(58) Field of Classification Search
CPC ............. H04N 19/467; H04N 21/8352; H04N 21/8358; G06K 9/00744; G06T 11/60; G10L 19/018
See application file for complete search history.

(56) References Cited

U.S. PATENT DOCUMENTS

| | | | | |
|---|---|---|---|---|
| 5,905,800 A | * | 5/1999 | Moskowitz | G06T 1/0028 380/28 |
| 2003/0028381 A1 | * | 2/2003 | Tucker | H04H 20/31 704/273 |
| 2014/0222438 A1 | * | 8/2014 | Courtney, III | H04L 67/2823 704/500 |
| 2015/0287156 A1 | * | 10/2015 | Mai | G06T 1/005 382/100 |

\* cited by examiner

*Primary Examiner* — Stephen R Koziol
*Assistant Examiner* — Timothy Choi
(74) *Attorney, Agent, or Firm* — Lessani Law Group, PC (57) ABSTRACT

The present disclosure describes a system, method, and computer program for encoding and decoding a unique signature for a user in a video file, wherein the video file was created using a video format that does not specifically support embedding a unique signature in the video file. A unique signature, comprising a plurality of data bits, is associated with a user and divided into groups. For each group, a different sine wave is created for each bit in the group. The frequencies of the sine waves correspond to the types of bits, and the amplitudes of the sine waves indicate the values of the bits. Group signals are overdubbed on the infrasound range of the audio track of the video file. The unique signature is decoded from the video file by analyzing the frequencies and amplitudes of sine waves in the infrasound range of the audio track.

20 Claims, 10 Drawing Sheets

SYSTEM, METHOD, AND COMPUTER PROGRAM FOR ENCODING AND DECODING A UNIQUE SIGNATURE IN A VIDEO FILE

BACKGROUND OF THE INVENTION

1. Field of the Invention

This invention relates generally to digital rights management, and, more specifically, to encoding and decoding a unique signature in a video file that was created in a format that does not support digital rights management.

2. Description of the Background Art

There are companies that provide platforms that enable users to easily make videos, such as animations. For digital rights management, it sometimes desirable for a company to be able to identify the creator of a video, found on the Internet or elsewhere, that was made on the company's platform.

The problem is that known digital rights management (DRM) technology is not designed to identify a creator of a video. Rather, known DRM technology is designed either to prevent a user from copying media or to restrict access to media to certain devices. For example, known DRM technology prevents unauthorized copies by ensuring that unauthorized copies are missing data.

In addition, known DRM technology requires the media to be created in a format that specifically supports DRM technology. Videos made by lay people using a video-creation platform may not be made using a format that support DRM. This is further complicated by the fact that video hosting platforms, such as YOUTUBE, compress video files, which means any data encoded in the files may not survive compression. Therefore, there is a desire for a method for encoding a user ID in a video file, wherein the method enables the encoded user ID to survive compression and wherein the method does not require the video format used to create the video to specifically support DRM or encoding a user ID.

SUMMARY OF THE DISCLOSURE

The present disclosure describes a system, method, and computer program for encoding and decoding a unique signature for a user in a video file, wherein the video file was created using a video format that does not expressly support embedding a unique signature in the video file and wherein the video file includes an audio track.

A unique signature, comprising a plurality of data bits, is associated with a user. The unique signature is then divided into a plurality of groups. Each group is associated with a sequence number, and each group includes one or more sequence number bits and one or more data bits.

For each group, a different sine wave is created for each bit in the group. Each of the sine waves has a frequency that represents whether the bit is a sequence number bit or a data bit, and, if there is more than one sequence number bit or data bit in the group, which sequence number or data bit. The amplitude of a sine wave represents the value of the bit to which the sine wave corresponds.

For each group, a group signal is created by combining the sine waves of the group. The frequency of each group signal is below a predefined limit and is in a range that is inaudible to humans (i.e., the infrasound range)

Frequencies below the predefined limit are removed from an audio track in the video file. The group signals are then overdubbed onto the audio track. Gaps are left between the groups in order to later distinguish the groups. Because the frequencies of the group signals are below the human auditory range, group signals are not detectable to a person during play of the video file.

In certain embodiments, the group signals are overdubbed over the audio track at fixed intervals. In other embodiments, the audio signal is analyzed in frames, and a group signal is overdubbed on a frame only if the amplitude of the audio signal within the frame exceeds a threshold.

To identify the creator of a video, the unique signature is decoded from the video files. Frequencies above the predefined limit are removed from the audio track of the video file. Each of the group signals are identified from the gaps in the remaining audio track.

Each group signal is deconstructed into individual sine waves. In certain embodiments, a Fast Fourier transform is used to deconstruct each group signal with buckets wide enough to distinguish between the frequencies used in the encoding process. Those sine waves having frequencies corresponding to the frequencies of the sine waves used in the encoding step are identified.

For each group, the value of the sequence number bits and the data bits in the group are identified from the amplitude of the sine waves having frequencies corresponding to the respective bits. The sequence number of each group is determined from the value of the sequence number bits. The unique signature is recreated by concatenating the data bits in the groups in order of the sequence numbers of the groups.

DETAILED DESCRIPTION OF THE PREFERRED EMBODIMENTS

Figure 1A:
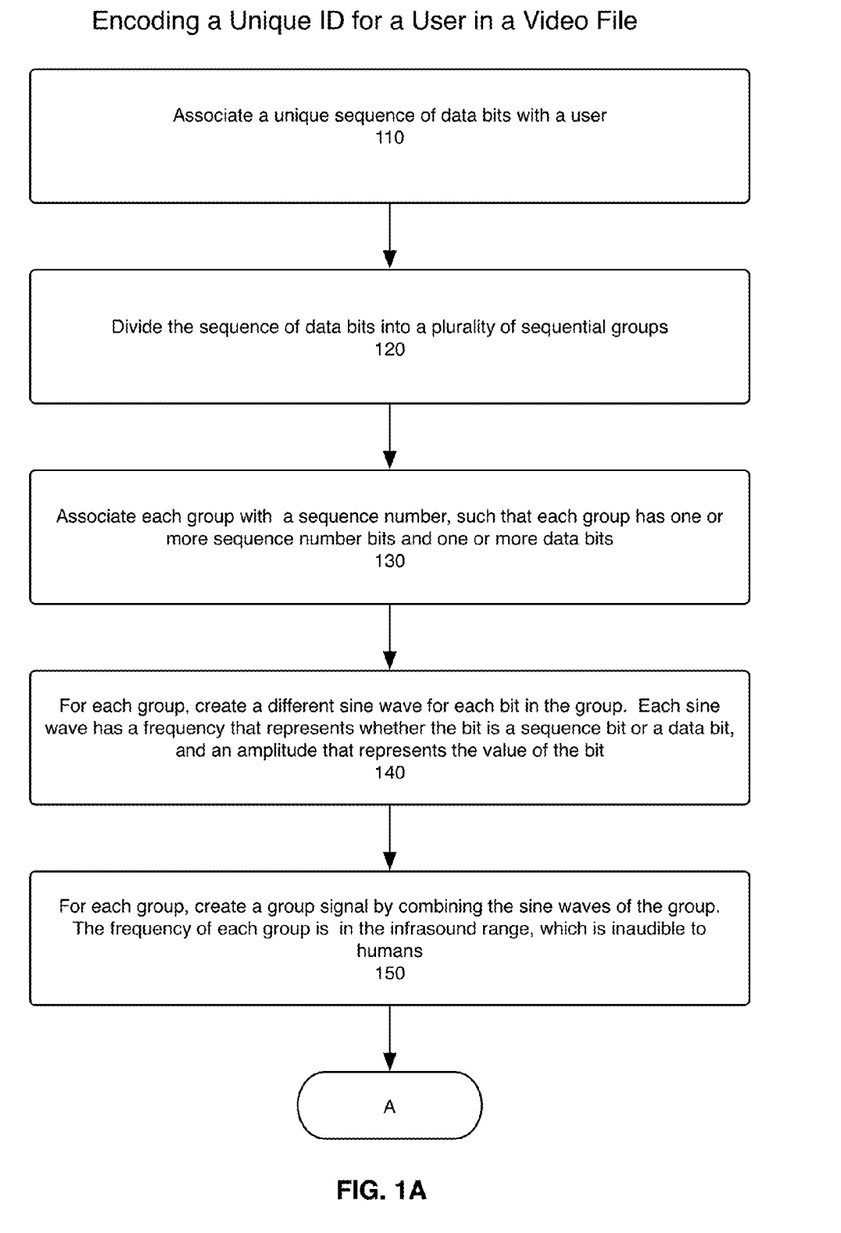
FIGS. 1A-1B are flowcharts that illustrate a method for encoding a unique signature in video file according to one embodiment.
Figure 1B:
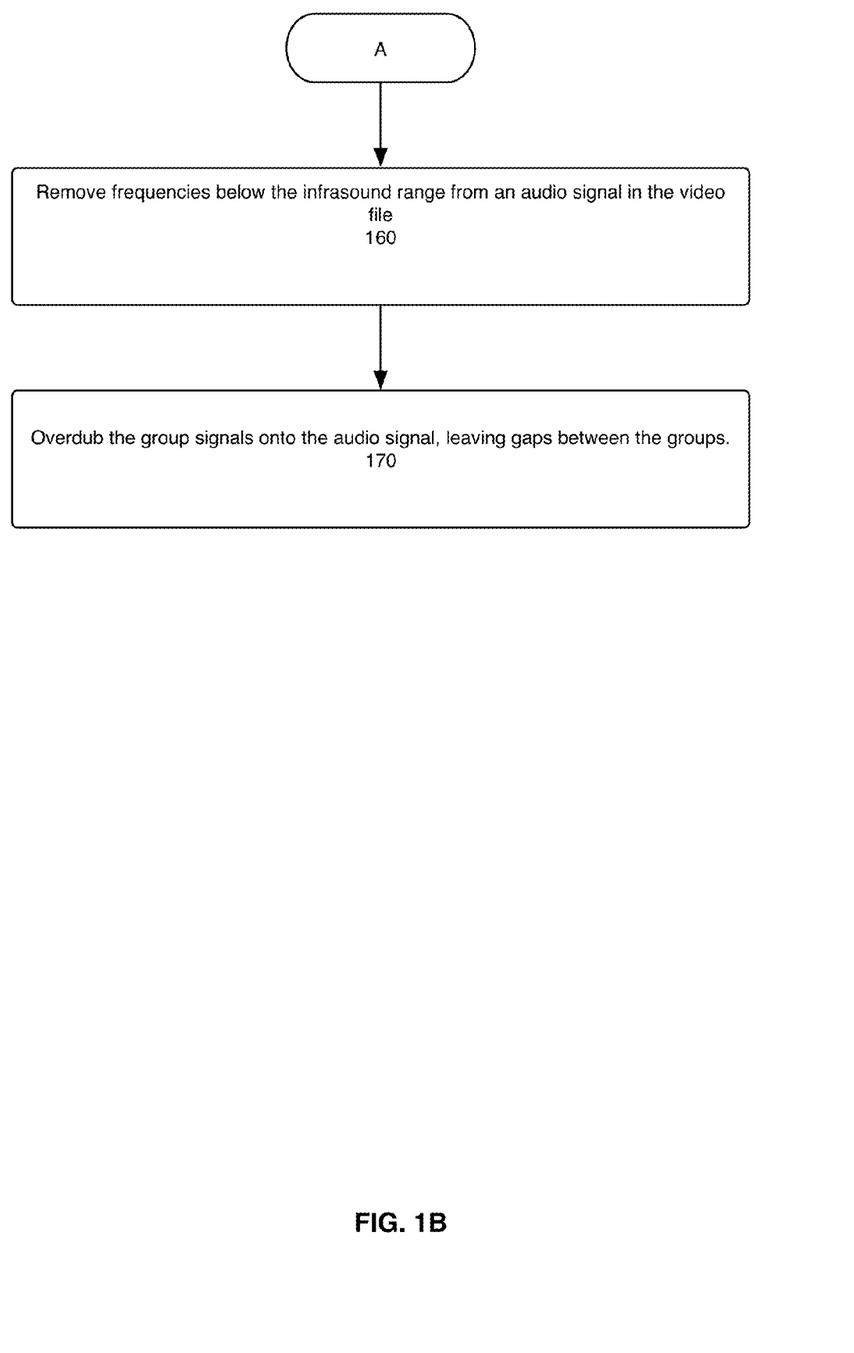
Figure 2A:
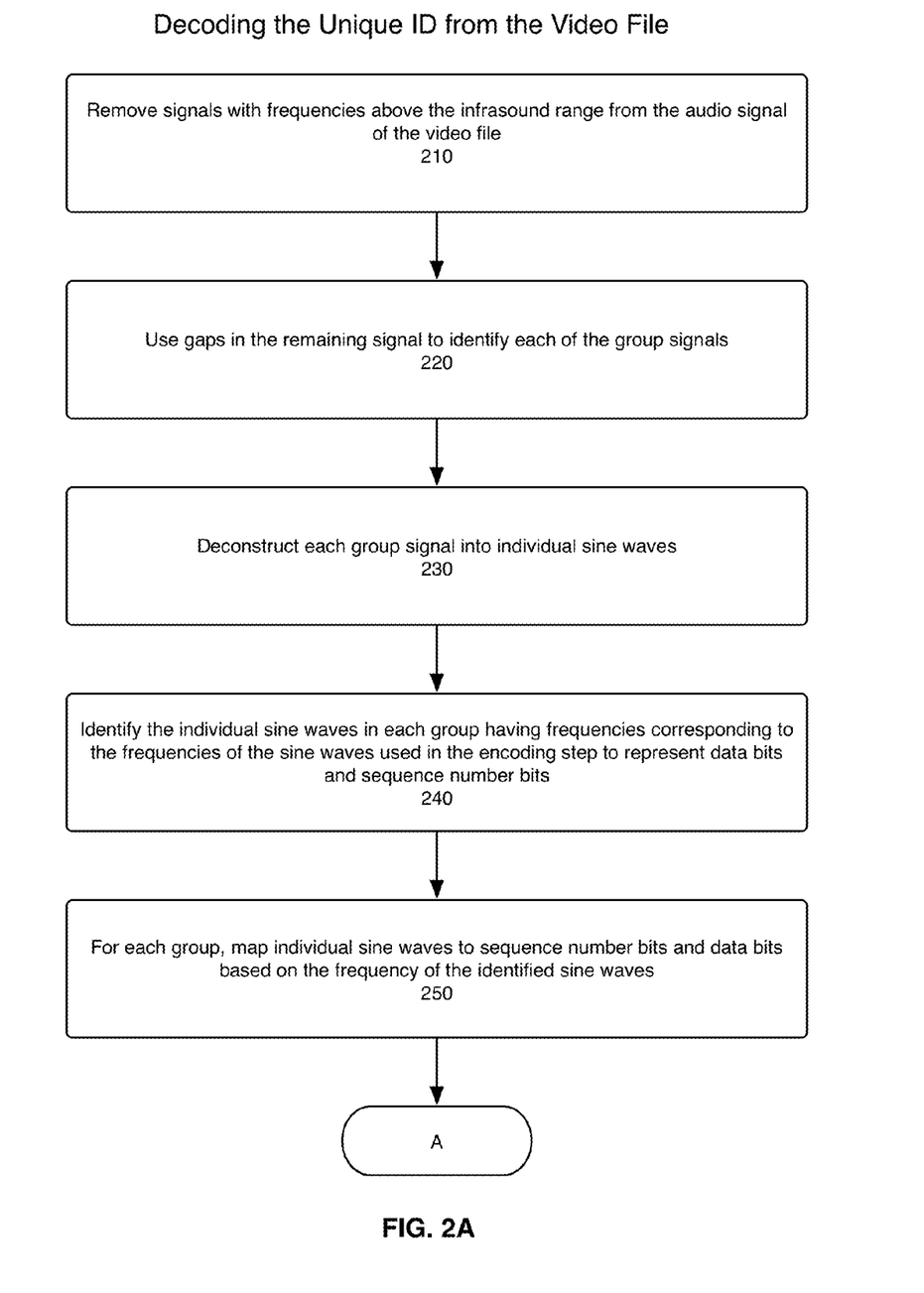
FIGS. 2A-B are flowcharts that illustrate a method for decoding a unique signature in video file according to one embodiment.
Figure 2B:
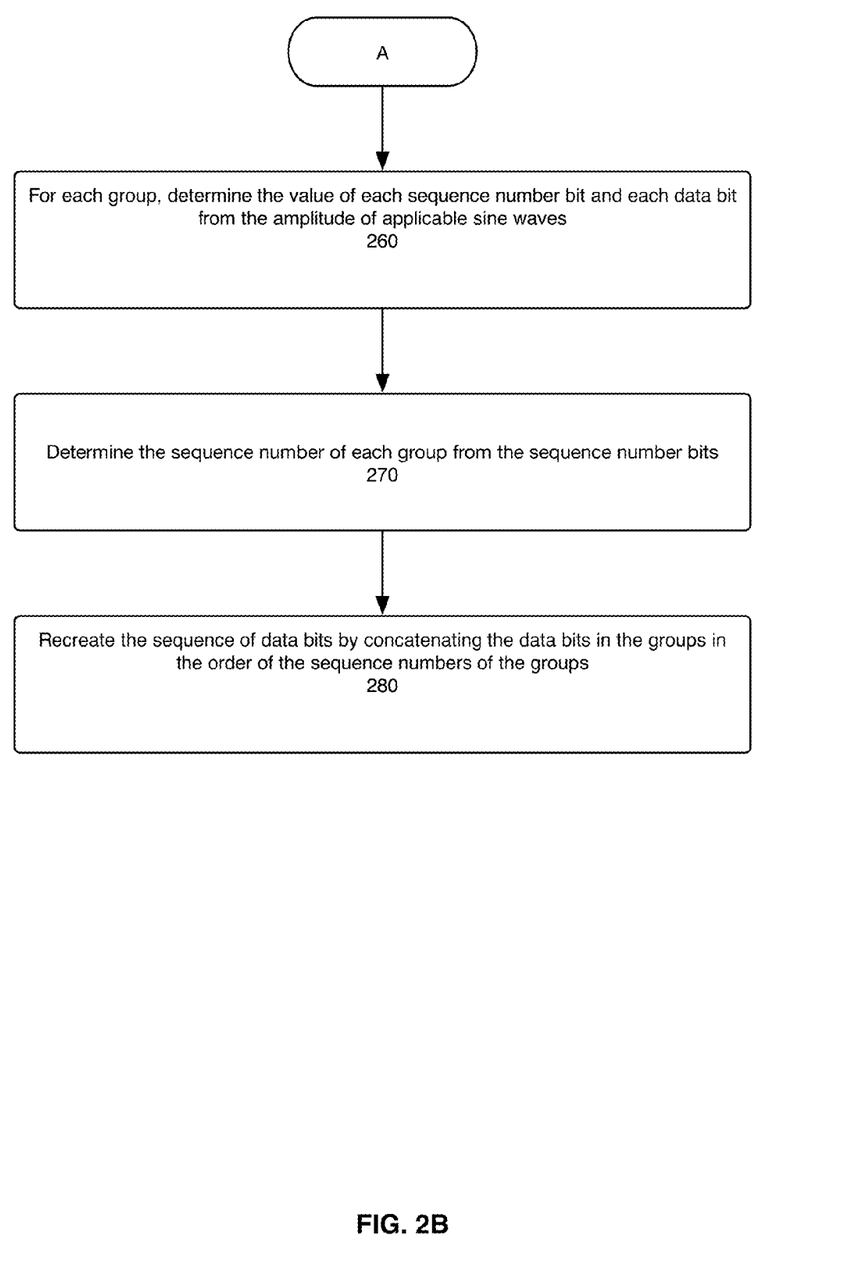

FIGS. 1A-1B illustrate a method for encoding a unique signature for a user in a video file that is in a format not specifically designed to support an embedded signature. The video file includes an audio track, and, as discussed below, signals representative of the unique signature are dubbed onto the audio track. FIGS. 2A-B illustrate a method for later decoding the unique signature from the video file. The methods are performed by a computer system executing software that embodies the methods (the "system").

Encoding a Unique ID in a Video File

Referring to FIG. 1A, the system associates a unique signature, comprising a plurality of data bits, with a user (step 110). In one embodiment, there are up to 123 bits in the unique signature. In certain embodiments, each user is associated with a different integer that serves as a unique ID, and the unique signature is created by converting the number to a ternary or binary number. For example, if a user is associated with the integer "102," the unique signature is created by converting the integer into a ternary number (i.e., "010210") or a binary number (i.e., "01100110").

The system divides the unique signature into a plurality of sequential groups (step 120), and it associates each group with a sequence number (step 130), which is represented by sequence number bits. In other words, each group comprises one or more sequence number bits and one or more data bits of the unique signature. The unique signature can be recreated from the groups, using the sequence numbers of groups to put the data bits from the unique signature in the right order.

For each group, the system creates a different sine wave for each bit in the group having a non-zero value (step 140). Each sine wave has a frequency that represents whether the bit is a sequence number bit or a data bit and an amplitude that represents the value of the bit. For example, if a group comprises two sequence number bits, and two data bits, sine waves with 5 Hz and 13 Hz frequencies may be used for the sequence number bits, and sine waves with 3 Hz and 7 Hz frequencies may be used for the data bits. If the unique signature is a ternary number, then a sine wave with full amplitude could represent the value "2," a sine wave with half amplitude could represent the value "1," and the lack of a sine wave could represent the value 0. The system then combines the sine waves in each group to create a group signal (step 150).

In order for the unique signature to be resilient to transcoding, it needs be embedded in the video file in way that would cause an encoder/transcoder to preserve it as relevant information. Most audio/video encoders are lossy and only preserve information deemed relevant to reconstruct the video/audio signal in a way that is indistinguishable to a human from the original. The infrasound band of the audio spectrum is a good place to embed the unique signature, as common encoders (e.g., AAC and MP3) preserve this band and concentrate instead on compressing higher frequencies. Also, this part of the audio spectrum is inaudible to humans, and, therefore, embedding signals in this spectrum will not affect the sound of the video to a human. Consequently, in the preferred embodiment, all the frequencies of the sine waves created in step 140, as well the resulting group signals, are in the infrasound band (e.g., less than 20 Hz).

To add the unique signature to the video file, the system removes signals frequencies below the infrasound range from the audio track of the video file (step 160). The system then overdubs the group signals onto the audio signal (step 170), leaving gaps between the groups so that in the decoding process the groups can be distinguished from each other.

In one embodiment, the group signals are overdubbed on the audio track at regular intervals (e.g. 1 second group signals separated by 0.25 seconds of silence). Once all the group signals have been added to the audio track, the process is repeated until the end of the audio track. This means that the audio track may include multiple instances of the group sequence throughout its duration.

In an alternate embodiment, the overdubbing is based on the signal strength in the audio track. The audio track signal is analyzed for strength (amplitude) in fixed-duration frames (e.g., 1 second). If the frame contains a strong enough signal to mask the unique signature, a group signal is overdubbed on the frame itself. Otherwise, a next candidate frame is analyzed by moving forward a certain amount (e.g., 0.25 seconds) on the audio track. In one embodiment, a frame is considered to have a strong enough signal if it exceeds a threshold amplitude, wherein the threshold is based on a theoretical maximum group signal amplitude. In one embodiment, the frame signal is considered strong enough to mask the group signal if the group signal amplitude is equal to or less than 25% of the amplitude of the frame signal.

In one embodiment, the unique signature must not exceed 123 bits, and the video file must include an audio track sampled at 44.1 Khz or above.

In one embodiment, the system is part of a platform than enables end users to create video animations. An example of such a platform is the GOANIMATE platform. As the platform system generates the video file for the user (based on user input), the unique signature is embedded in the video file.

Decoding the Unique Signature from the Video File

FIGS. 2A-B illustrate a method for decoding a unique signature from a video file (e.g., a video file downloaded from the Internet and encoded with a unique signature). As the unique signature is embedded in the infrasound range, all signals with frequencies above this range are removed from the audio track of the video file (step 210). This leaves signals with frequencies only in the infrasound range. The system uses the gaps between signals in the infrasound range to identify each of the group signals (step 220).

The system deconstructs each group signal into individual sine waves (step 230). In one embodiment, this is done using a Fast Fourier Transform analysis with buckets wide enough to distinguish between the frequencies used in the encoding process.

The system then analyzes the individual sine waves to identify those having frequencies corresponding to the frequencies of the sine waves used in the encoding step to represent data bits (e.g., unique signature bits) and sequence number bits (step 240).

The system maps each identified sine wave to a specific sequence number bit or data bit based on the frequency of the sine wave (step 250). The value of each sequence number bit and data bit in each group is determined from the amplitude of the particular sine wave (step 260). For example, if 5 Hz is used for the least significant sequence number bit, then the system knows this sine wave corresponds to such bit, and the amplitude of the sine wave indicates the value of the bit.

Where the sequence number bits represent ternary or binary numbers, the system converts the sequence number bits for each group into an integer sequence number (step 270). For example, if the sequence number bits for a group are "2" and "0", and the bits represent ternary numbers, the system knows that the sequence number for the group is integer number 1. The system recreates the digital signature by concatenating the data bits in each group in the order of the sequence numbers of the groups (step 280).

Example Implementation

An example of the above-described methods are described below with respect to Tables 1-9 and FIGS. 3-9. This is just an example of one way to implement the above-described methods and not limiting of the methods.

Signal Generation (Encoding)

In this example, the user has the integer number "102" as his unique ID. To create the unique digital signature from the unique ID, 102 is converted into a ternary number, which is as follows:

Ternary Representation: 01 02 10 (3+2×9+81=102)

Four sine waves are used to embed this digital signature. Two sine waves with frequencies of 5 Hz and 13 Hz will be used for the sequence number bits, and two sine waves with frequencies of 3 Hz and 7 Hz will be used for the unique signature bits (i.e., the data bits). The unique signature, which consists of six bits, will be divided into groups, each with two sequence number bits and two data bits.

Each group sequence number is represented as ternary bits, as indicated in the Table 1 below:

TABLE 1

| Group Sequence Number (Integer format) | Ternary Sequence Bit 0 (5 Hz) - Value | Ternary Sequence Bit 1 (13 Hz) - Value |
| --- | --- | --- |
| Calibration | 2 | 2 |
| 0 | 0 | 1 |
| 1 | 0 | 2 |
| 2 | 1 | 0 |
| 3 | 1 | 1 |
| 4 | 1 | 2 |

In the above table, the least significant bit in a group is Ternary Bit 0, and the most significant bit in a group is Ternary Bit 1. Having up to five groups enables 10 (5×2) ternary bits to be encoded for a maximum of 59,049 combinations (or unique IDs with integer numbers between 0 and 59,048). The calibration sequence, which has all ternary bits set to 2, is useful to calibrate the decoding system (as discussed below).

Table 2 below illustrates the unique signature bits (data bits) in each group for the unique ID 102:

TABLE 2

| Group Sequence Number (Integer Format) | Ternary Data Bit 0 (3 Hz) | Ternary Data Bit 1 (7 Hz) |
| --- | --- | --- |
| 0 | 0 | 1 |
| 1 | 2 | 0 |
| 2 | 1 | 0 |
| 3 | 0 | 0 |
| 4 | 0 | 0 |

In the above table, the least significant bit in a group is Ternary Bit 0, and the most significant bit in a group is Ternary Bit 1.

Table 3 below illustrates the relative amplitudes of the four sine waves created for each group. The two left-most ternary bits are the sequence number bits, and the two right-most ternary bits are the data bits (i.e., unique signature bits).

TABLE 4

| Group | Sine Wave Amplitudes Ternary Bits (sequence and data) | 5 Hz | 13 Hz | 3 Hz | 7 Hz |
| --- | --- | --- | --- | --- | --- |
| Calibration | 2, 2, 2, 2 | 25% | 25% | 25% | 25% |
| 0 | 0, 1, 0, 1 | — | 12.5% | — | 12.5% |
| 1 | 0, 2, 0, 2 | — | 25% | 25% | — |
| 2 | 1, 0, 1, 0 | 12.5% | — | 12.5% | — |
| 3 | 1, 1, 0, 0 | 12.5% | 12.5% | — | — |
| 4 | 1, 2, 0, 0 | 12.5% | 25% | — | — |

The amplitude percentages above are percentages of the maximum amplitude that can be stored on the audio track. Therefore, if the maximum amplitude that can be stored on the audio track is 40 db, a sine wave having an amplitude of ~10 db will represent the ternary value of "2," and a sine wave having an amplitude of ~5 db will represent a ternary value of "1."

Figure 3:
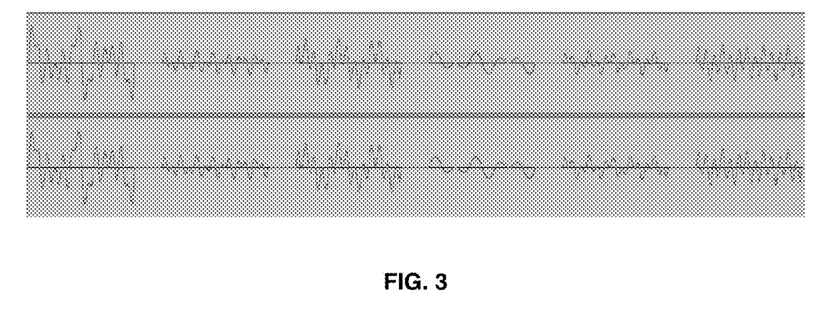
FIGS. 3, 4, 5A, 7A, 8A, and 9 are waveforms used to illustrate an example of the methods disclosed herein.

The four sine waves in each group are combined to create a group signal for the group. The complete sequence of groups is illustrated in FIG. 3 (note that each group is separated by a space (e.g., silence)).

Figure 4:
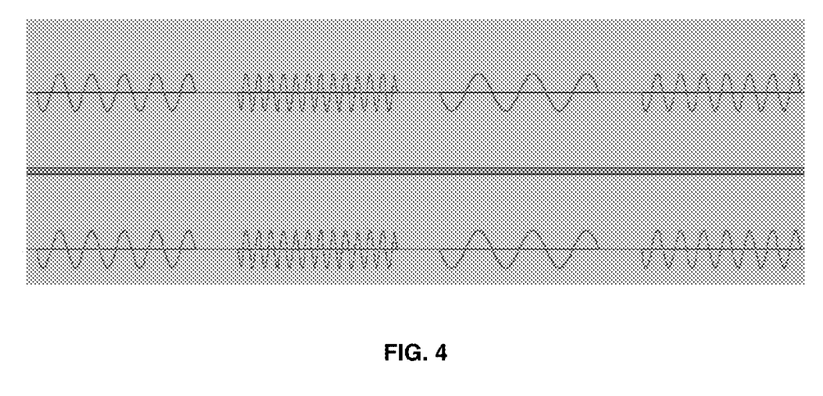

To understand the composition of each group signal, we can decompose the first group signal (the "calibration" group) and note that it was generated by mixing the four waves illustrated in FIG. 4.

Overdubbing

Figure 5A:
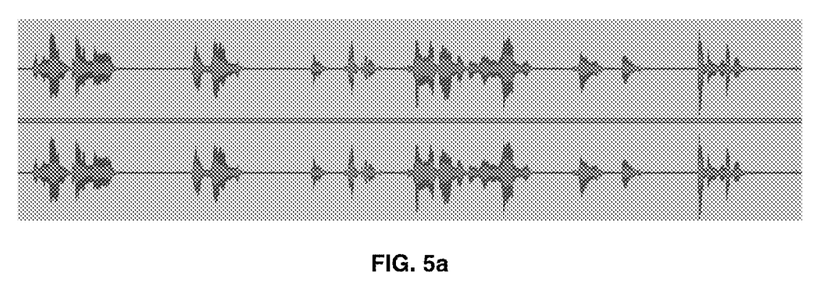
Figure 5B:
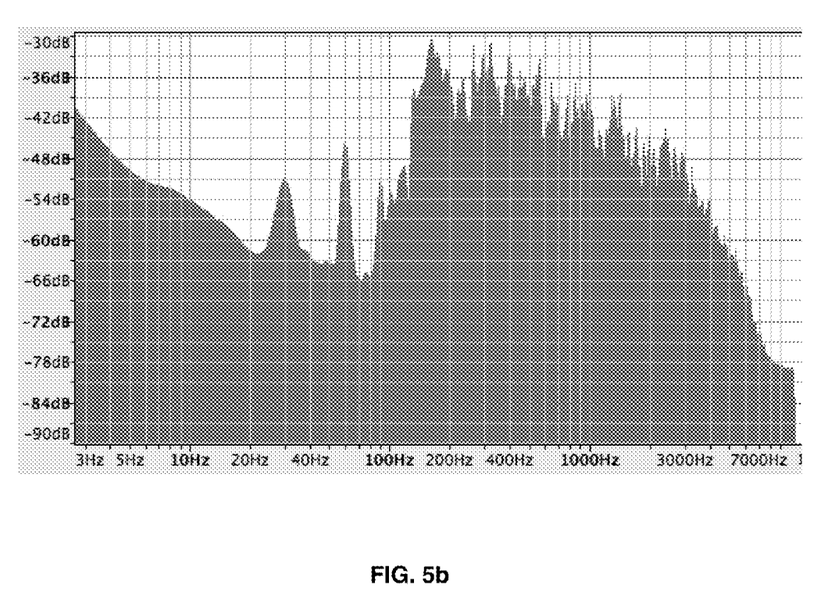
FIGS. 5B, 6, 7B, and 8B are spectrograms used to illustrate an example of the methods disclosed herein.

The sequence of group signals is then overdubbed on the original audio track of a video file, looping it from start to finish in order to cover the whole duration of the original audio. For purposes of this example, each group signal is overdubbed for 1 second, followed by 0.25 second gaps between group signals. FIG. 5a illustrates the audio track for this example, which has a duration of 15 seconds. FIG. 5b illustrates the related frequency spectrogram.

Figure 6:
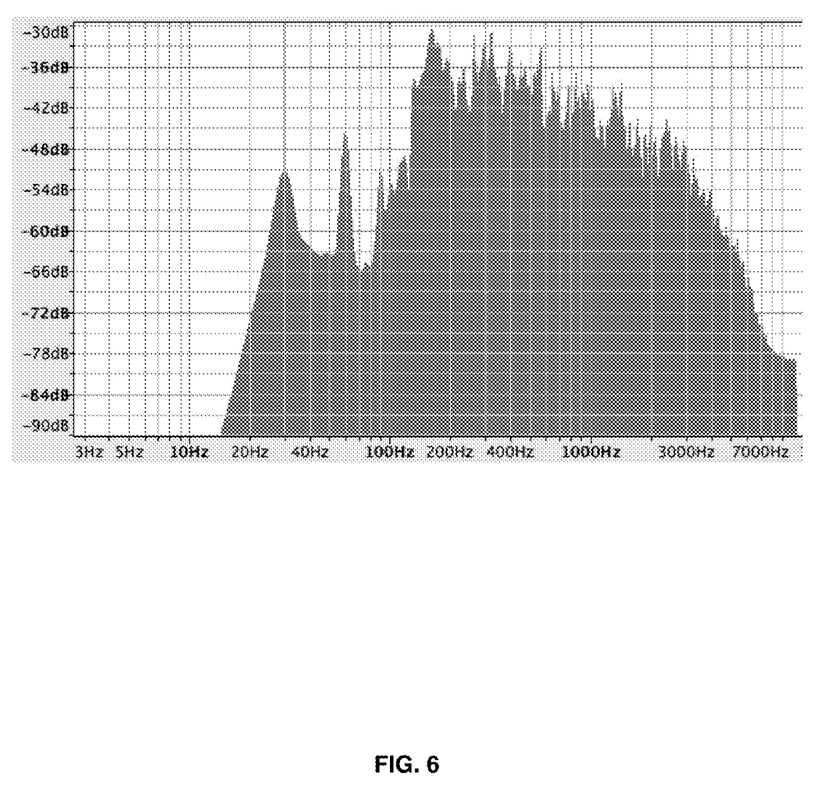
Figure 7A:
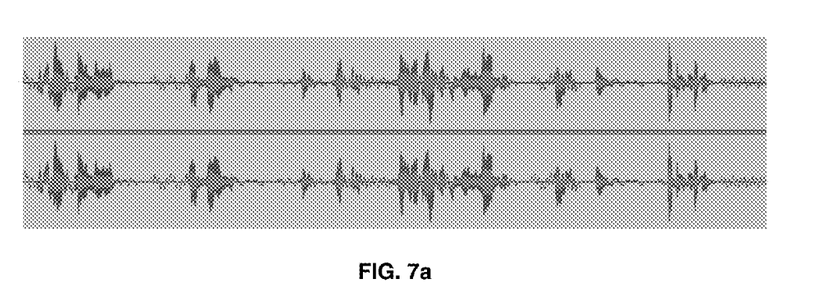
Figure 7B:
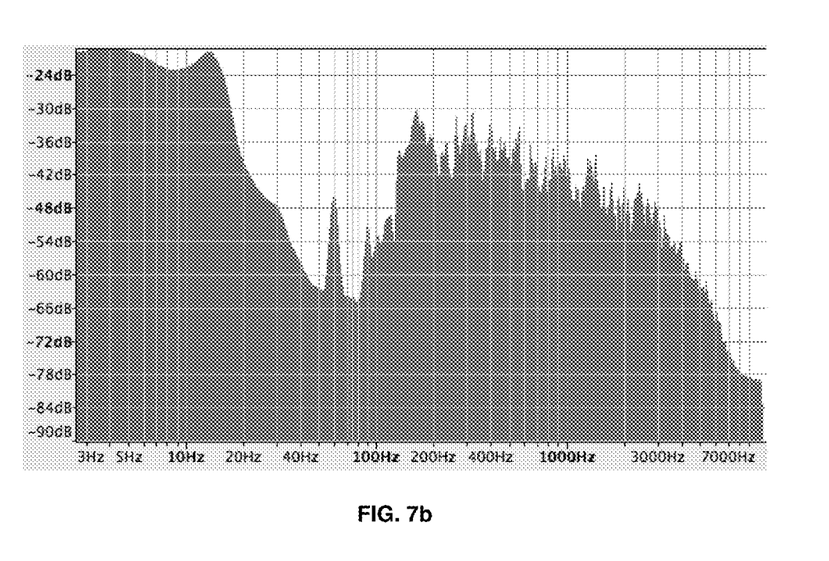

In order to overdub the unique signature, frequencies below 20 Hz are removed from the audio track. Sounds at these frequencies are inaudible and will not be noticed when removed. FIG. 6 illustrates the frequency spectrogram when a high-pass filter at 25 Hz is applied to the audio signal. The unique signature is then overdubbed onto the remaining audio signal, resulting in the waveform illustrated in FIG. 7a, which plots to the frequency spectrogram in FIG. 7b. The original audio track is then replaced in the target video file with the filtered and overdubbed audio track.

Decoding

Removing Unnecessary Frequencies

Figure 8A:
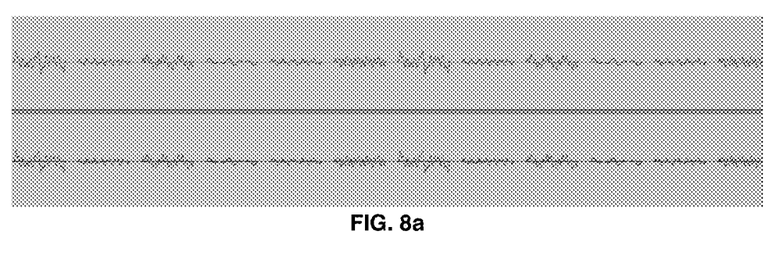
Figure 8B:
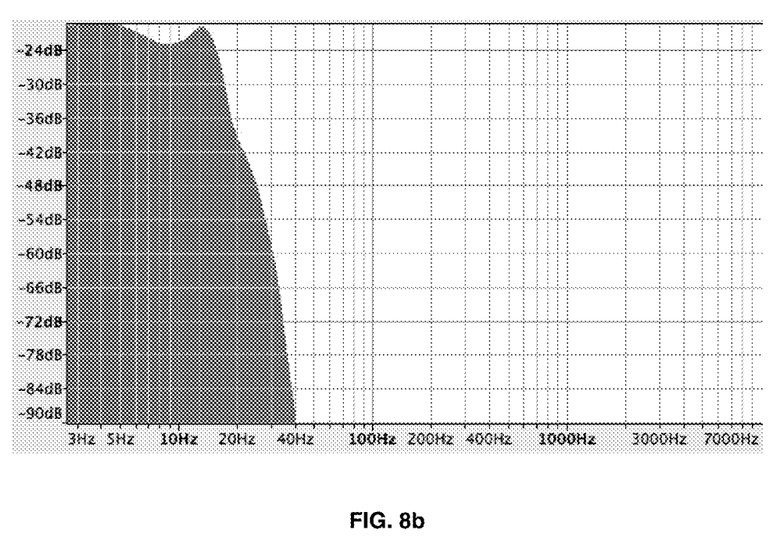

The first step in the decoding process is to remove all frequencies above 20 Hz through a low-pass filter since frequencies above 20 Hz are not part of the unique signature. FIG. 8A illustrates the resulting waveform, and the spectrum analysis in FIG. 8B illustrates the frequencies in play.

Figure 9:
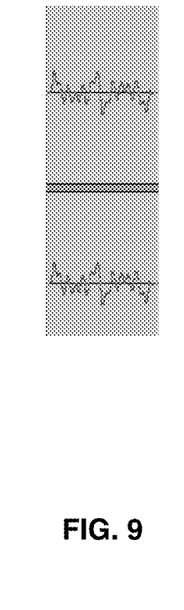

Once the frequencies above 20 Hz are removed from the audio track, the group signals can be identified by looking at the gaps between signals. FIG. 9 illustrates the first group (the "calibration" group).

In order to determine the amplitude of the group's components, a FFT analysis is run with buckets wide enough to distinguish between the original frequencies. An FFT analysis with 44,100 points over 1 second of audio data results in 22,050 buckets of 1 Hz each. This provides enough separation to isolate frequencies of interest. For the first group, this results in the following data:

TABLE 5

| Frequency (Hz) | Amplitude |
| --- | --- |
| (DC Offset) | 30.4380376598 |
| 1 | 58.5886510151 |
| 2 | 420.2787637881 |
| 3 | 683.9611593603 |
| 4 | 832.9792092872 |
| 5 | 629.7254774691 |
| 6 | 824.2247666843 |
| 7 | 701.6410952705 |
| 8 | 405.1519539124 |
| 9 | 45.7046487393 |
| 10 | 37.6339476121 |
| 11 | 39.821715285 |
| 12 | 400.7346142158 |
| 13 | 768.3206464348 |
| 14 | 399.724772282 |
| 15 | 34.4455805305 |
| 16 | 33.6250037487 |
| 17 | 31.8099392116 |
| 18 | 29.3880111935 |
| 19 | 27.0296059976 |

Relevant frequencies (i.e., 3, 5, 7, and 13) are bolded. Since this is the "Calibration" group, the expected maximum amplitude (e.g., the amplitude corresponding to Ternary bit value "2") for each frequency of interest is as follows:

TABLE 6

| Frequency | Meaning | Amplitude |
|---|---|---|
| 5 Hz | Sequence Number bit 0 | 629 |
| 13 Hz | Sequence Number bit 1 | 768 |
| 3 Hz | Data bit 0 | 683 |
| 7 Hz | Data bit 1 | 701 |

Repeating the same FFT analysis over another group results in the following values:

TABLE 7

| Frequency (Hz) | Amplitude |
|---|---|
| (DC Offset) | 5.5821762405 |
| 1 | 30.7042724264 |
| 2 | 206.2251123983 |
| 3 | 323.7944205867 |
| 4 | 405.6971668409 |
| 5 | 325.8027326038 |
| 6 | 204.8138063691 |
| 7 | 29.6427971081 |
| 8 | 6.5059694382 |
| 9 | 6.5984732472 |
| 10 | 6.6533211611 |
| 11 | 6.647010936 |
| 12 | 6.6112156383 |
| 13 | 6.4805638885 |
| 14 | 6.3347136951 |
| 15 | 6.0413375486 |
| 16 | 5.8004016926 |
| 17 | 5.5289838432 |
| 18 | 4.8704968703 |
| 19 | 4.6858400346 |

This give the following mapping:

TABLE 8

| Frequency | Meaning | Amplitude/Max Amplitude from "Calibration" group | % of Max amplitude from Calibration Group |
|---|---|---|---|
| 5 Hz | Sequence Number bit 0 | 325/629 | 50% |
| 13 Hz | Sequence Number bit 1 | 6/768 | 0% |
| 3 Hz | Data bit 0 | 323/683 | 47% |
| 7 Hz | Data bit 1 | 29/701 | 4% |

The derived values for the ternary bits in the group would then be:

TABLE 9

| Element | Value |
|---|---|
| Sequence Number bit 0 | 1 |
| Sequence Number bit 1 | 0 |
| Data bit 0 | 1 |
| Data bit 1 | 0 |

This corresponds to the the encoded bits (1,0,1,0) for the group with Sequence Number 2.

The foregoing decoding analysis is repeated on all sequences found in the audio track. Statically analysis may be performed to weigh the likelihood of the values for each sequence, thus introducing error correction in the retrieval algorithm.

General

The methods described with respect to FIGS. 1-9 and Tables 1-9 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for encoding and decoding a unique signature for a user in a video file, wherein the video file was created using a video format that does not support embedding a unique signature in the video file and wherein the video file includes an audio track, the method comprising:
    encoding a unique signature into a video file by performing the following:
        associating a unique sequence of data bits with a user;
        dividing the sequence of data bits into a plurality of sequential groups, wherein each group is associated with a sequence number and wherein each group includes one or more sequence number bits and one or more data bits;
        for each group, creating a different sine wave for each bit in the group having a non-zero value, wherein each of the sine waves has (1) a frequency that represents whether the bit is a sequence number bit or a data bit, and, if there is more than one sequence number bit or data bit in the group, which sequence number or data bit and (2) an amplitude that represents the value of the bit;
        for each group, creating a group signal by combining the sine waves of the group, wherein the frequency of each group signal is in the infrasound range;
        removing frequencies below the infrasound range from an audio track in the video file;
        overdubbing the group signals onto the audio track, wherein gaps are left between the groups and wherein the group signals are not detectable to a person during play of the video file; and
    decoding the unique signature from the video file by performing the following:
        removing signals with frequencies above the infrasound range from the audio track of the video file;
        identifying each of the group signals in the remaining audio track using gaps in the remaining audio track to distinguish between groups;
        deconstructing each group signal into individual sine waves;
        identifying the individual sine waves in each group having frequencies corresponding to the frequencies of the sine waves used in the encoding step to represent the data bits and the sequence number bits;
        for each group, ascertaining the value of each sequence number bit and each data bit in the group from the amplitude of the sine waves having frequencies corresponding to said bits;
        determining the sequence number of each group from the value of the sequence number bits; and
        recreating the sequence of data bits by concatenating the data bits in the groups in order of the sequence numbers of the groups.

2. The method of claim 1, wherein the unique sequence is a digital sequence of up to 123 bits.

3. The method of claim 1, wherein each user is associated with a different integer, and wherein the unique sequence of data bits is created by converting the integer to a ternary number.

4. The method of claim 3, further comprising:
deriving the unique signature from the recreated sequence of data bits by converting the ternary number represented by the sequence of data bits into an integer.

5. The method of claim 1, wherein each user is associated with an integer, and wherein the unique sequence is creating by converting the integer into a binary number.

6. The method of claim 1, wherein the group signals are overdubbed over the audio track at fixed intervals.

7. The method of claim 6, wherein the group signals are generated for 1 second and overdubbed over the audio track at a distance of 0.25 seconds from each other.

8. The method of claim 1, wherein, in the overdubbing step, the audio track is analyzed in frames, and a group signal is overdubbed over a frame in the audio track only if the amplitude of the audio track within the frame exceeds a threshold.

9. The method of claim 8, wherein the group signals are generated for 1 second and the frames are 1 second frames.

10. The method of claim 1, wherein the group signal is deconstructed into individual sine waves using a Fast Fourier Transform analysis with buckets wide enough to distinguish between the frequencies used in the encoding step.

11. A non-transitory, computer-readable medium comprising a computer program, that, when executed by a computer system, enables the computer system to perform the following method for encoding and decoding a unique signature for a user in a video file, wherein the video file was created using a video format that does not support embedding a unique signature in the video file and wherein the video file includes an audio track, the method comprising:
encoding a unique signature into a video file by performing the following:
associating a unique sequence of data bits with a user;
dividing the sequence of data bits into a plurality of sequential groups, wherein each group is associated with a sequence number and wherein each group includes one or more sequence number bits and one or more data bits;
for each group, creating a different sine wave for each bit in the group having a non-zero value, wherein each of the sine waves has (1) a frequency that represents whether the bit is a sequence number bit or a data bit, and, if there is more than one sequence number bit or data bit in the group, which sequence number or data bit and (2) an amplitude that represents the value of the bit;
for each group, creating a group signal by combining the sine waves of the group, wherein the frequency of each group signal is in the infrasound range;
removing frequencies below the infrasound range from an audio track in the video file;
overdubbing the group signals onto the audio track, wherein gaps are left between the groups and wherein the group signals are not detectable to a person during play of the video file; and
decoding the unique signature from the video file by performing the following:
removing signals with frequencies above the infrasound range from the audio track of the video file;
identifying each of the group signals in the remaining audio track using gaps in the remaining audio track to distinguish between groups;
deconstructing each group signal into individual sine waves;
identifying the individual sine waves in each group having frequencies corresponding to the frequencies of the sine waves used in the encoding step to represent the data bits and the sequence number bits;
for each group, ascertaining the value of each sequence number bit and each data bit in the group from the amplitude of the sine waves having frequencies corresponding to said bits;
determining the sequence number of each group from the value of the sequence number bits; and
recreating the sequence of data bits by concatenating the data bits in the groups in order of the sequence numbers of the groups.

12. The non-transitory, computer-readable medium of claim 11, wherein the unique sequence is a digital sequence of up to 123 bits.

13. The non-transitory, computer-readable medium of claim 11, wherein each user is associated with a different integer, and wherein the unique sequence of data bits is created by converting the integer to a ternary number.

14. The non-transitory, computer-readable medium of claim 13, further comprising:
deriving the unique signature from the recreated sequence of data bits by converting the ternary number represented by the sequence of data bits into an integer.

15. The non-transitory, computer-readable medium of claim 11, wherein each user is associated with an integer, and wherein the unique sequence is creating by converting the integer into a binary number.

16. The non-transitory, computer-readable medium of claim 11, wherein the group signals are overdubbed over the audio track at fixed intervals.

17. The non-transitory, computer-readable medium of claim 11, wherein, in the overdubbing step, the audio track is analyzed in frames, and a group signal is overdubbed over a frame in the audio track only if the amplitude of the audio track within the frame exceeds a threshold.

18. The non-transitory, computer-readable medium of claim 11, wherein the group signal is deconstructed into individual sine waves using a Fast Fourier Transform analysis with buckets wide enough to distinguish between the frequencies used in the encoding step.

19. A computer system for encoding and decoding a unique signature for a user in a video file, wherein the video file was created using a video format that does not support embedding a unique signature in the video file and wherein the video file includes an audio track, the method comprising, the system comprising:
one or more processors;
one or more memory units coupled to the one or more processors, wherein the one or more memory units store instructions that, when executed by the one or more processors, cause the system to perform the operations of:
encoding a unique signature into a video file by performing the following:
associating a unique sequence of data bits with a user;
dividing the sequence of data bits into a plurality of sequential groups, wherein each group is associated with a sequence number and wherein each group includes one or more sequence number bits and one or more data bits;
for each group, creating a different sine wave for each bit in the group having a non-zero value, wherein each of the sine waves has (1) a frequency that represents whether the bit is a sequence number bit or a data bit, and, if there is more than one sequence number bit or data bit in the group, which sequence number or data bit and (2) an amplitude that represents the value of the bit;

for each group, creating a group signal by combining the sine waves of the group, wherein the frequency of each group signal is in the infrasound range;

removing frequencies below the infrasound range from an audio track in the video file;

overdubbing the group signals onto the audio track, wherein gaps are left between the groups and wherein the group signals are not detectable to a person during play of the video file; and decoding the unique signature from the video file by performing the following:

removing signals with frequencies above the infrasound range from the audio track of the video file;

identifying each of the group signals in the remaining audio track using gaps in the remaining audio track to distinguish between groups;

deconstructing each group signal into individual sine waves;

identifying the individual sine waves in each group having frequencies corresponding to the frequencies of the sine waves used in the encoding step to represent the data bits and the sequence number bits;

for each group, ascertaining the value of each sequence number bit and each data bit in the group from the amplitude of the sine waves having frequencies corresponding to said bits;

determining the sequence number of each group from the value of the sequence number bits; and recreating the sequence of data bits by concatenating the data bits in the groups in order of the sequence numbers of the groups.

20. The system of claim 19, wherein the group signal is deconstructed into individual sine waves using a Fast Fourier Transform analysis with buckets wide enough to distinguish between the frequencies used in the encoding step.

* * * * *